June 19, 1945.  S. SIMKOVITS  2,378,737

APPARATUS FOR THE PURIFICATION OF LIQUIDS

Filed June 16, 1939  2 Sheets-Sheet 1

Inventor
SANDOR SIMKOVITS

By *[signature]*
Attorney.

June 19, 1945.    S. SIMKOVITS    2,378,737
APPARATUS FOR THE PURIFICATION OF LIQUIDS
Filed June 16, 1939    2 Sheets-Sheet 2

Inventor
SANDOR SIMKOVITS
By *Attorney.*

Patented June 19, 1945

2,378,737

UNITED STATES PATENT OFFICE 2,378,737

APPARATUS FOR THE PURIFICATION OF LIQUIDS

Sándor Simkovits, Budapest, Hungary; vested in the Alien Property Custodian

Application June 16, 1939, Serial No. 279,533
In Hungary June 28, 1938

2 Claims. (Cl. 210—154)

The invention relates to apparatus for the purification, particularly for the filtering of liquids, especially of oil, the said apparatus being much simpler, of greater output capacity and greater safety of service as compared to apparatus of a similar kind known up to now.

The filtering apparatus according to the invention is fitted with filtering members arranged in the container intended to accommodate the liquid to be filtered, and through which the liquid to be filtered is driven by pressure or drawn by suction. The substance of the invention consists in that the filtering member is composed of a single filtering drum, or of a plurality of filtering drums, provided in the container, preferably in the vicinity of the bottom of the latter, a pipe for the discharge of the filtered liquid, projecting into the interior of the drum or drums, being connected to the said drum or drums.

The advantages of the arrangement according to the invention are the following:

1. Owing to the arrangement of the drum or drums, not only its or their cylindrical surfaces, but also the end surfaces opposite to each other are representing effective working surfaces, which circumstance assures a high amount of filtering surface.

2. With pneumatic operation, the filter drum or drums will remain active until the level of the liquid sinks below the upper end surface of the said drum or drums.

3. The active surface of the filtering members will be considerably increased, and, moreover, the inactive space will be substantially reduced. It is well-known, that in the case of apparatus of this kind, inactive space is represented by that part of the vessel which is situated below the plane laid through the highest point of the filtering body.

The increase of the filtering surface will also cause the necessary frequency of cleanings to be substantially reduced as it will be possible for the impurities to become distributed over a larger surface.

4. In the case of the filter according to the invention, the discharge of the filtered liquid is effected in a very simple manner by means of a single pipe issuing into the filtering drum or drums. In connection herewith the complicated system of ducts provided in the lid of the container in the types of apparatus employed up to now, through which system of ducts the various filtering pipes, communicated with the common discharge pipe, can be dispensed with.

The invention is equally applicable for filtering apparatus in which the liquid is driven through the filter by means of compressed air, and for apparatus in which this is done by means of liquid pressure. In the case of apparatus of the last-named type, it is also possible, in order to increase the filtering surface, to provide additional cylindrical or flattened filtering pipes on the filtering drum, the said pipes starting from the lid plate of the filtering drum and being arranged, preferably spaced uniformly, around the pipe for the discharge of the filtered liquid, it being also possible for the said additional pipes to extend as far as to the lid of the container.

It is, however, also possible to effect filtering by suction.

The accompanying drawings illustrate a number of embodiments shown by way of example, viz.:

Figure 5:
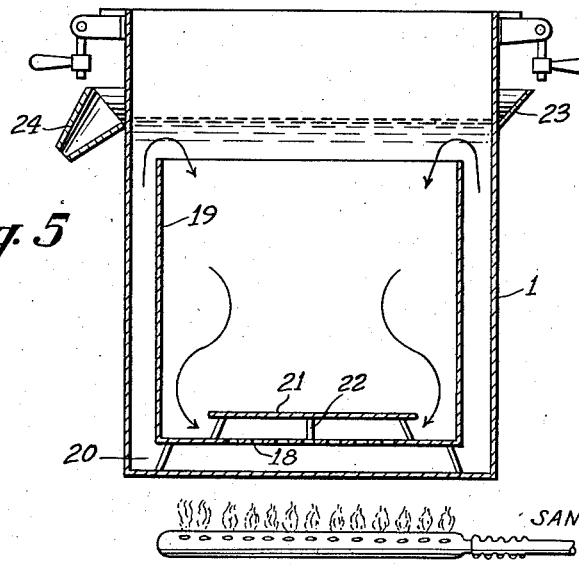

On Fig. 5 the circulating device mounted into the container when boiling the liquid is represented during use.

The container 1, which is closed in an airtight manner by the lid 3 (Fig. 1) is filled, e. g. up to the height indicated on the drawings with the liquid to be filtered. Through the branch 2, fitted with a non-return valve not shown on the drawings, compressed air is delivered into the container. In the container 1 a filtering drum 5 is suspended at a certain distance from the bottom of the container, so that not only the cylindrical surface of the said drum but also its bottom and top surfaces are representing active working surface. The height of the filtering drum amounts preferably to a fraction, at most to one-third, e. g. to one-fifth or one-sixth of the height of the container 1. The filtering drum 5 is surrounded in a known manner by a filtering cloth 6, which receives the coarser impurities.

The filtering drum 5 preferably possesses the form of a flat cylinder, of a prism, or of a hollow body of any desired shape, which may also be oval and the height of which is smaller than its smallest dimension measured at right angles to its longitudinal axis.

Figure 1:
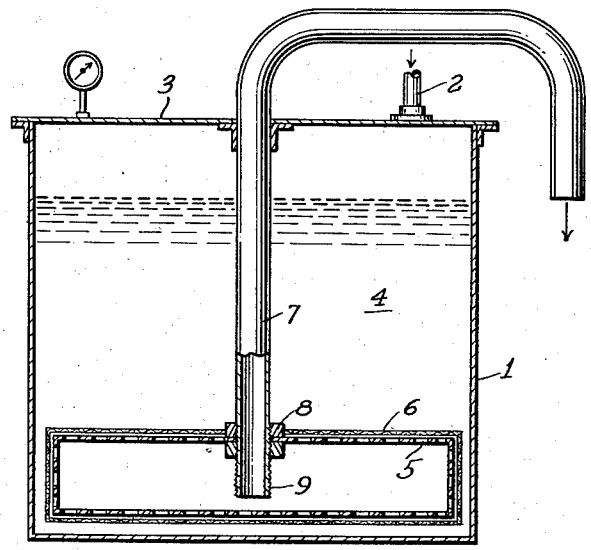
Fig. 1 is a vertical section of an embodiment in which the liquid to be filtered is driven through the filtering drum by means of air pressure acting on the level of the liquid, it being also possible to replace the pressure effect by a suction effect.

According to Fig. 1, the drum 5 is suspended on the central discharge pipe 7, e. g. in such a manner that the branch 9 of the said pipe, which projects into the drum, is screwed into the sleeve 8.

Under the action of the pressure of the compressed air or liquid, introduced through the branch 2, or of the vapours produced when heating the liquid, e. g. oil, to be filtered, the level of the liquid contained in the container 1 will gradually sink, the liquid will pass through the walls of the filtering drum 5 into the interior of the said drum, and the filtered liquid will be discharged in the direction of the arrows through the branch 9, and through the pipe 7.

Figure 2:
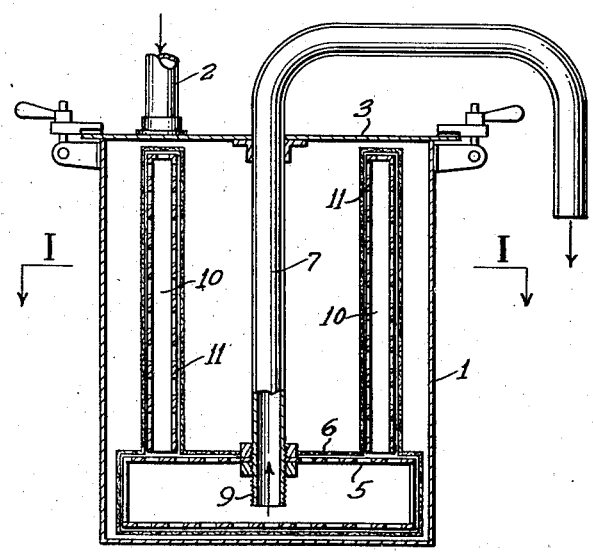
Fig. 2 is a vertical longitudinal section of another embodiment in which the liquid to be filtered is driven through the filtering drum by the gauge pressure of the liquid delivered under pressure into the container.
Figure 3:
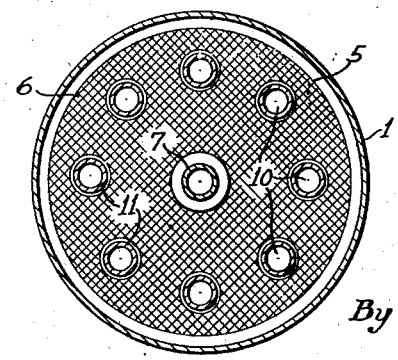
Fig. 3 is a horizontal section along line I—I of Fig. 2.

The embodiment according to Figs. 2 and 3 differs from the one according to Fig. 1 in that filtering pipes 10, of e. g., circular cross-section, and of any desired height, extending, say approximately up to the lid 3, are branching off from the filtering drum 5, the said pipes being arranged, preferably uniformly spaced, around the pipe 7. Each of the filtering pipes 10 is covered by a filtering cloth 11. The container 1 is filled with the liquid delivered into it under pressure through the branch 2, the said liquid being, owing to the pressure above the atmospheric, driven to the filtering pipes 10 and through the filtering drum 5. The filtered liquid is discharged in the direction of the arrow through the pipe 7.

In the case of all embodiments, the shape of the drum 5 may, of course, also differ from the shapes represented on the embodiments illustrated.

Figure 4:
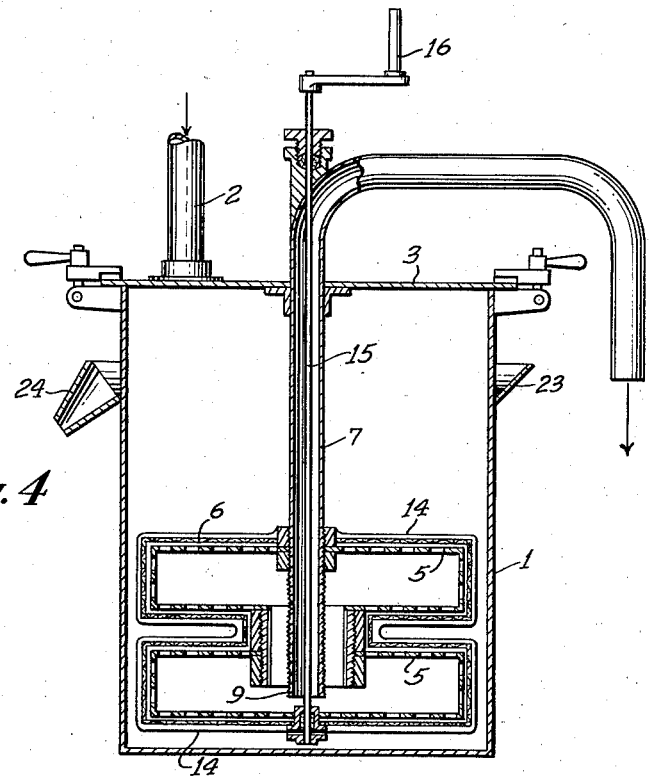
Fig. 4 is a vertical section of an embodiment in which two filtering drums fitted with scrapers are employed.

In the case of the filtering apparatus according to Fig. 4 two filtering drums 5, 5 are provided in order to increase the output capacity of the apparatus. Any desired number of drums may, in fact, be provided. The apparatus according to Fig. 4 differs from the one according to Fig. 2 also by the provision of scraper bars for cleaning the filtering drum, which are mounted on the pole 15 and may be operated, for instance, by means of a handle 16. The pole 15 is mounted in a manner tight against leakage below in the drum bottom and above in the pipe 7. The scraper device 14 may also be operated under pressure so that, for the purposes of cleaning, it is not necessary to dismantle the apparatus.

If oil is to be filtered, and particularly if it is contaminated by a substantial quantity of water, the oil should, before filtering, after the removal of the lid 3 and of the filtering drum 5, first be boiled. For this purpose use is made of the circulating device represented on Fig. 5, which consists of a vessel 19 with perforated bottom 18, and is supported by means of legs 20 on the bottom of the container 1. On the bottom of the vessel 19 a lid 21, fitted with legs 22 and serving for covering the bottom holes 18 is supported.

When the container filled with oil and equipped with this circulating device is heated, the circulation of liquid indicated by means of arrows on Fig. 5 is set up. This circulation prevents the possibility of the water contained in the oil becoming evaporated suddenly and spurting out oil. Thereby it will be possible to avoid, on the one hand, losses, and, on the other hand, any danger of fire. A duct 23, running around the cylindrical shell of the container 1, and fitted with a spout 24 is provided for catching any oil that might be carried over after all.

I claim:
1. A filtering apparatus of the class described comprising a container adapted to receive fluid material to be treated, a cover sealed over the container, an outlet pipe extending through the cover and projecting downwardly into said container, a filter drum suspended on the lower portion of the outlet pipe and surrounding the inlet end thereof, means for applying a pressure upon the fluid material in the container to force said material through the filter drum and out through the outlet pipe, a rotatable shaft extending to the exterior of the container and having an operating crank thereon, a scraper member attached to said shaft and rotated thereby, said scraper member closely overlying the outer surface of the filter drum whereby the actuation of the scraper member removes accumulated matter from the filter drum surface.

2. A filtering apparatus of the class described comprising a container adapted to receive fluid material to be treated, a cover sealed over the container, an outlet pipe extending through the cover and projecting downwardly into said container, a filter drum suspended on the lower portion of the outlet pipe and surrounding the inlet end thereof, means for applying a pressure upon the fluid material in the container to force said material through the filter drum and out through the outlet pipe, a rotatable shaft extending through the outlet pipe, said shaft having an operating crank at its upper end and a scraper member attached to the lower end of the shaft, said scraper member closely overlying the outer surface of the filter drum whereby the actuation of the scraper member removes accumulated matter from the filter drum surface.

SÁNDOR SIMKOVITS.